Dec. 8, 1970    J. B. ALLEN ETAL    3,546,652
THERMOSTATIC CONTROL FOR ROOM AIR CONDITIONERS AND THE LIKE
Filed May 6, 1968    3 Sheets-Sheet 1

James B. Allen.
John T. Hancock,
Inventors
Koenig, Senniger,
Powers and Leavitt,
Attorneys.

Dec. 8, 1970    J. B. ALLEN ET AL    3,546,652
THERMOSTATIC CONTROL FOR ROOM AIR CONDITIONERS AND THE LIKE
Filed May 6, 1968    3 Sheets-Sheet 3

United States Patent Office 3,546,652
Patented Dec. 8, 1970

3,546,652
THERMOSTATIC CONTROL FOR ROOM AIR CONDITIONERS AND THE LIKE
James B. Allen and John T. Hancock, Versailles, Ky., assignors to Texas Instruments Incorporated, Dallas, Tex., a corporation of Delaware
Filed May 6, 1968, Ser. No. 727,108
Int. Cl. H01h 31/04, 37/20
U.S. Cl. 337—347
5 Claims

ABSTRACT OF THE DISCLOSURE

A high-accuracy thermostatic switch is designed for location in an electrical components compartment behind the control panel of a room air conditioner, and through which compartment a minor portion of room air being cooled flows so as to bypass the cooling evaporator element of the conditioner. The switch has a spring blade formed to snap and operate contacts in the electrical circuit for starting and stopping the cooling mechanism of the conditioner. The blade and contacts are located in an enclosing housing of the switch. Mounted on a bracket on and outside of the housing is a bimetallic thermostatic strip linked at one end to the snap blade through a small opening in the housing for controlling snap operation of the latter. The bracket provides means for attachment to the control panel of the conditioner. Threaded through the bracket is a control stem for the thermostatic strip. This stem extends through an opening in the panel for exterior access to adjust it. The electrical components compartment has an opening for by-pass air intended for heat-exchange with the switch. A heat-insulating shroud forms an integral part of the switch. It is cup-shaped and surrounds the bracket and thermostatic strip. It includes a bottom-wall layer interposed between the switch bracket and the switch housing. The cup-shaped shroud has side walls extending toward the panel on which the switch is mounted. If desired, one or more openings may be provided to assure proper air flow across the thermostatic strip. The margins of these walls are provided with resilient lips for engaging the panel so as effectively to seal off the thermostatic strip inside of the shroud from the interior of said electrical components compartment. The extent of the shroud is such as to cover said by-pass air opening. A nipple is provided through one wall of the shroud for connection with an air hose which extends from the nipple for connection with the air circuit of the conditioner.

---

The field of this invention is that of temperature control of air-conditioning apparatus, and more particularly room cooling apparatus.

A sensitive and accurate thermostatic switch type is known in which a snap spring blade controlled to snap by a bimetallic strip operates contacts to open and shut a control circuit of a motor drive or drives for room cooling units. In this connection see for example United States Pats. 2,074,132 and 3,395,375.

It is also known to provide means for moving a small amount of room air into heat-exchange relation with a switch and to by-pass this air around the cooling evaporator of the unit. This reduces temperature deviations in the room under control. In this connection see United States Pats. 3,194,027 and 3,293,875.

However, a problem has arisen in connection with the prior art apparatus in that the by-pass air has been allowed to flow over the entire thermostatic switch assembly. The result was that heat was transferred from this air and the switch to the bimetallic thermostatic temperature responsive element which caused a degree of erratic operation. Thus was lost the full potential of the operating accuracy of high-accuracy switches operating in a low-volume by-pass air flow.

The present invention solves the problem above referred to by restricting the flow of the variable-temperature by-pass air to contact with the bimetallic thermostatic strip only and also isolates the bimetallic thermostatic switch from the radiated heat effects caused by other electrical components in the electrical controls compartment. This is done by means of an integral switch construction which as a unit may conveniently be applied within an electrical components compartment or the like of any of various designs of air conditioning units.

In the accompanying drawings, in which is illustrated one of various possible embodiments of the invention, FIG. 1 is a longitudinal section, some parts being shown in elevation, illustrating our new switch assembly attached to a control panel, a contact-closed position being shown;

Similar reference characters indicate corresponding parts throughout the several views of the drawings.

Figure 1:
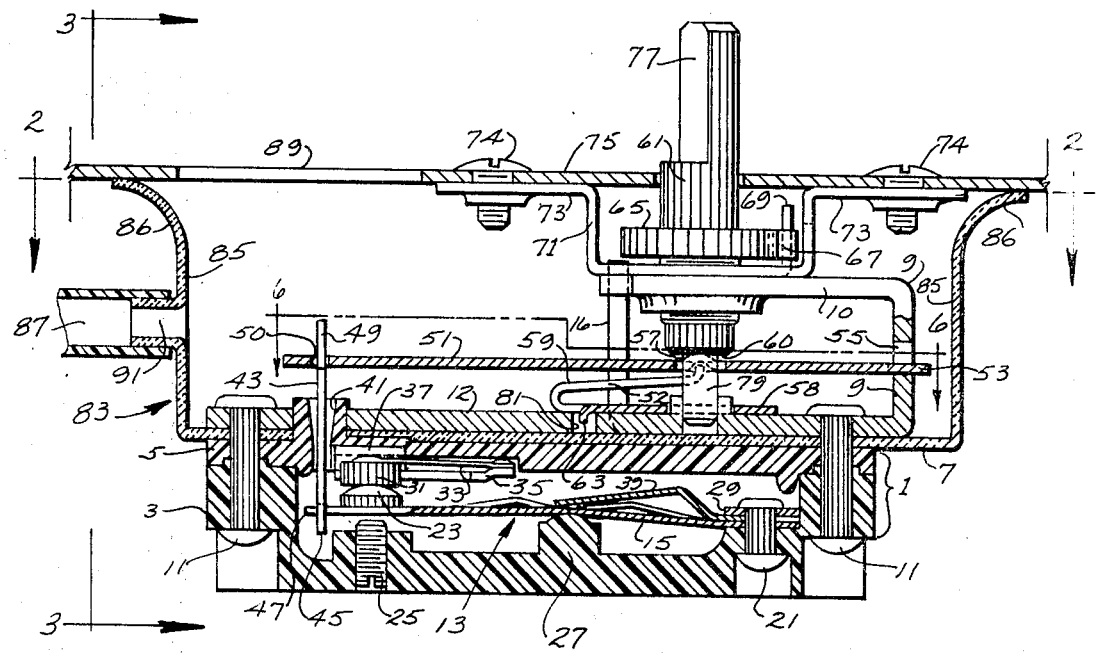

Referring to FIG. 1, numeral 1 indicates a molded phenolic resin or like electrically insulating housing for containing a spring snap blade and contact parts. This housing is constituted by a dished rectangular base 3 having a rectangular cover 5 on the top of which is located an electrical and heat-insulating barrier wall 7 composed of, for example, but without limitation to, a thermoset or thermo plastic resin felted with fibres of a substance such as asbestos, so-called rock wool or the like. It has some resiliency. Above the wall 7 is carried a bracket 9. Bracket 9 is rigid and has a short upper leg 10, a longer lower leg 12 and braces 16. The parts 3, 5, 7 and 9 are held together by rivets 11.

Figure 5:
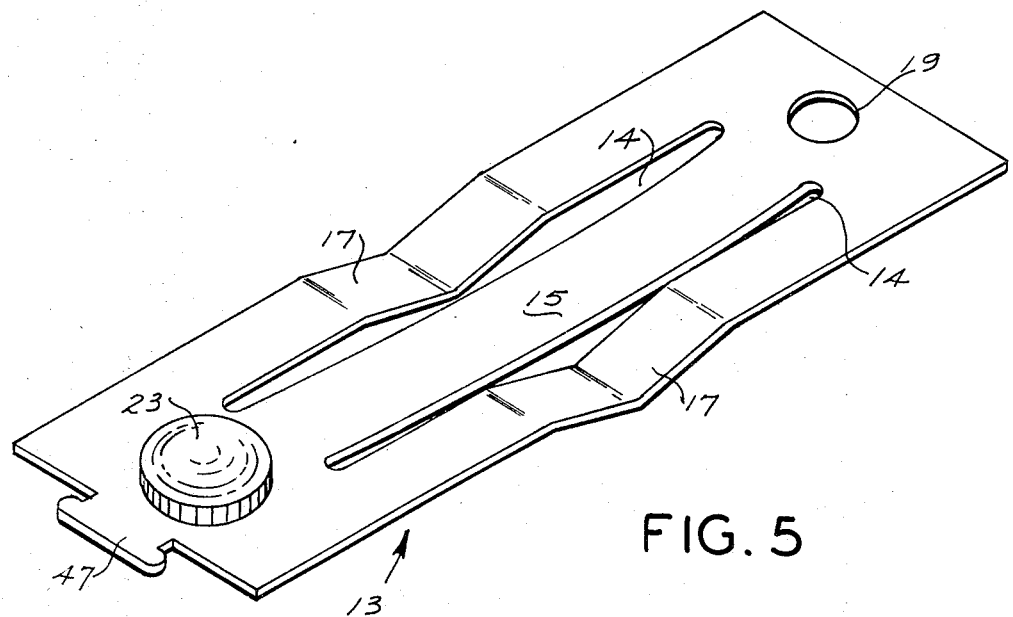
FIG. 5 is an isometric view of a snap blade.
Figure 6:
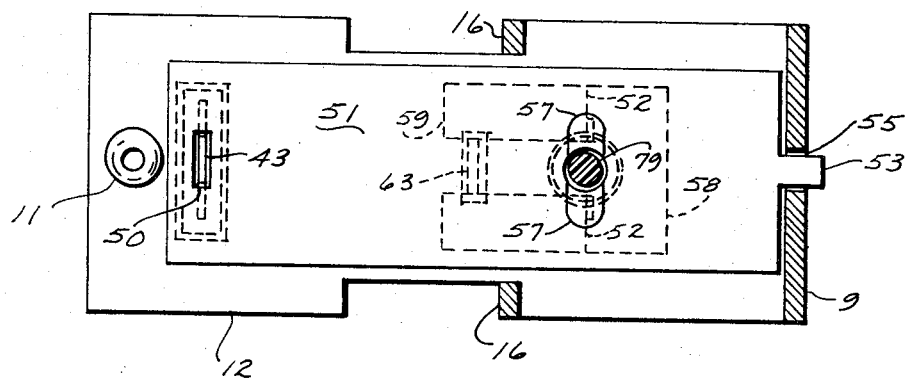
FIG. 6 is a cross section taken on line 6—6 of FIG. 1.

Within the housing 1 is located a snap spring blade 13 such as shown in FIG. 5. This blade is longitudinally double-slotted as at 14 so as to provide a central strip 15 and crimped transverse sidewise strips 17, which are thus placed in tension and place the strip 15 in compression, tending to bow it. The blade 13 has a hole 19 at one end through which it is held to the part 3 by a rivet 21. At its other end the blade 13 carries a contact 23 beneath which, in spaced relation thereto, there is an adjustable back-stop screw 25. The central portion of the strip 15 is supported on a fulcrum 27. The revit 21 also holds a line terminal 29 in electrically conductive relation to blade 13 and in addition it holds one end of a spring finger 39. The other end of the finger 39 holds the central part of strip 15 against the fulcrum 27.

A contact 31 is carried by one end of a spring arm 33 located above the movable contact 23. The other end of this arm is supported upon a rigid bracket 35, the latter being affixed to a line terminal 37 held in position between the parts 3 and 5. Thus the contact 31 is resiliently mounted.

Figure 2:
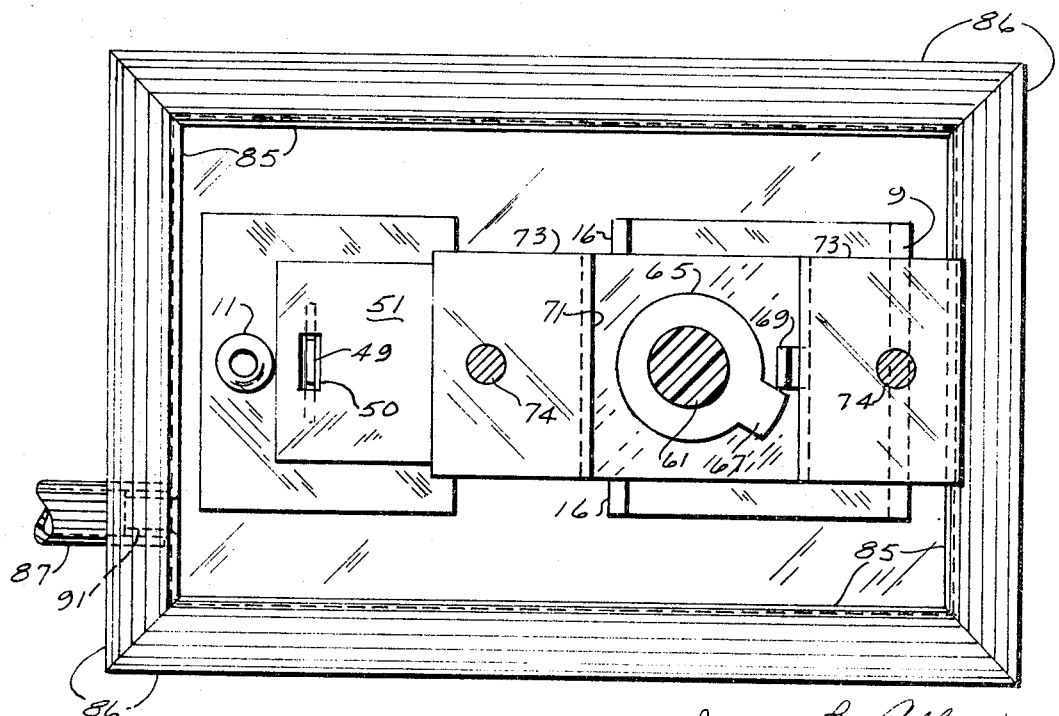
FIG. 2 is a cross section taken on line 2—2 of FIG. 1.
Figure 3:
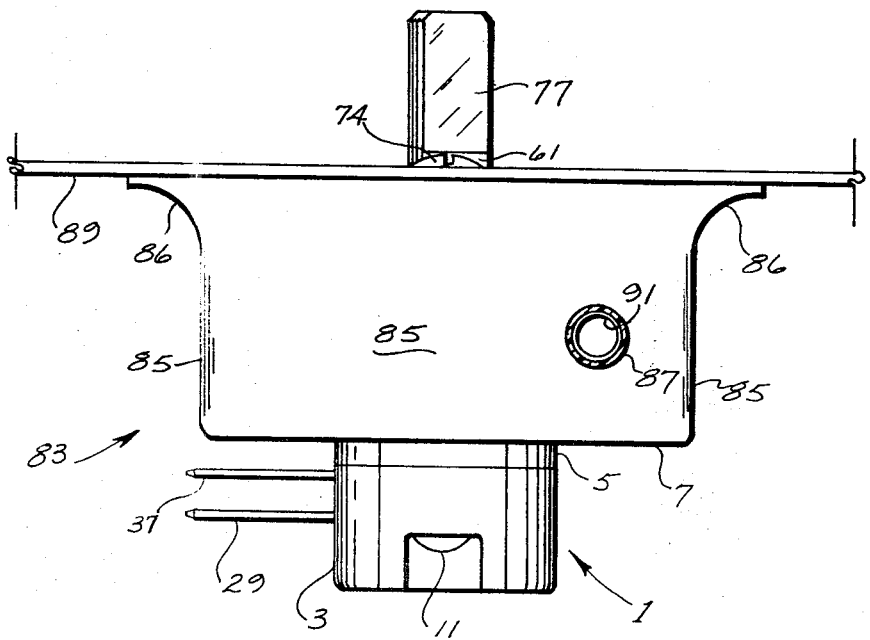
FIG. 3 is a left end view of FIG. 1.

The housing cover 5 is formed with a part 41 providing a small opening from the exterior to the interior of the housing 1. The part 41 extends through suitable openings in the heat-insulating wall 7 and the lower leg 12 of bracket 9. The opening through the part 41 accommodates a stiff compression link 43 which has a fork at 45 articulated with a T-head 47 on the snap blade 13. The upper end of the link 43 has a tongue 49 extending into a slot 50 of a bimetallic thermostatic strip 51 to form an articulation therewith. The high-expansion side of strip 51 is on its bottom side. The other end of the strip 51 is provided with a tongue 53 extending into a slot 55 of the bracket 9. Transversely spaced dimples 57 in the strip 51 are engaged by the ends of spaced upper legs 52 of a hair-pin type spring 59. One dimple 57 and one upper leg 52 appear in FIG. 1. The others are in front of the section. A wide lower leg 58 of spring 59 rests on top of the bottom leg 12 of the bracket 9. Thus the spring 59 pushes a mid-portion of the strip 51 against a shoulder 60 at the bottom end of a temperature adjusting screw 61 which is threaded through the upper leg 10 of the bracket 9. This screw 61 carries a disk 65 which has a lug 67 engageable with a stop pin 69 carried on a U-shaped extension 71 of bracket 9. The extension 71 has side ears 73 in which are threaded openings for receiving mounting screws 74 passing through the control panel 75 of the air conditioning unit which the switch serves. The bracket extension 71 is welded to the upper leg 10 of bracket 9. The outer end of the screw 61 has a flat portion 77 for the application of a hand-control knob (not shown) which is applied after the switch has been mounted on the panel 75 as shown in FIGS. 1 and 2. The lower end of screw 61, below its shoulder 60 is provided with a gudgeon 79 located in journal-forming openings in the lower spring leg 58 and in the lower leg 12 of bracket 9. Gudgeon 79 passes through an opening in the strip 51 between the dimples 57. The spring 59 is held in alignment by a struck-out tongue 63 located in an opening 81 in leg 12 of bracket 9.

Figure 4:
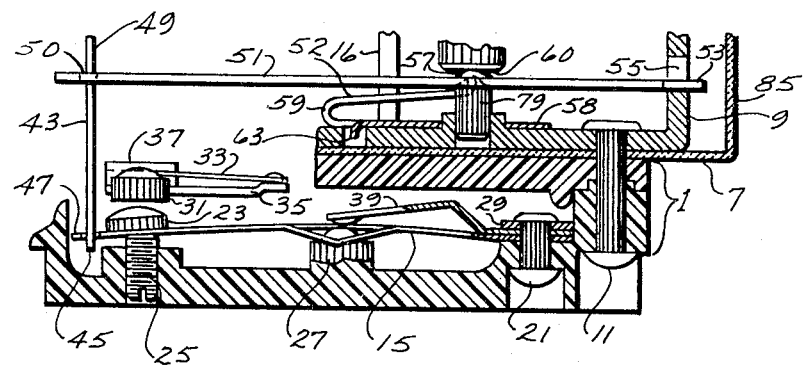
FIG. 4 is a fragmentary diagrammatic view illustrating a contact-open position of certain parts.

Operation of a sensitive switch of the known type above described briefly is as follows. The screw 61 is set for a desired room temperature. Forces in the strip 51 and snap blade 13 are in equilibrium through link 43 at this temperature (contacts 23, 31 open as in FIG. 4). Screw 25 has been adjusted at the factory for force equilibrium under these conditions. As the room warms, the forces in strip 51 relax and the blade 13 snaps to close the contacts. The spring rates of the strip and blade and the adjustment at screw 25 are made in known manner such that after snapping to closed-contact condition force equilibrium is again reached (contacts 23, 31 closed as in FIG. 1). Then as the room cools, these equilibrated forces again become reversely unbalanced, whereupon the blade 13 snaps open the contacts 23, 31, returning to the original open-contact equilibration of forces. Further details of the spring rates for the purpose may be obtained, if desired, from said Pat. 3,395,375. The fact that the contact 31 is spring mounted prevents contact-bounce at the time that the contacts close. This feature is also known in this type of switch.

That which has not been recognized in the art is that, if provisions are not made to prevent heat which is generated by the blade and contact parts in the housing 1, from affecting the strip 51, the action will be erratic despite the potential accuracy of switches of the present design and it is the purpose of the present invention to avoid this effect.

In view of the above, first the heat-insulating barrier wall 7 is provided between the outside strip and strip supports on the one hand and the snap blade and switch contact parts in the housing 1 on the other hand. Second, the heat-insulating wall 7 is formed as part of an enclosing shroud 83 having side walls 85, the outer margins of which are flared by curved lips 86 so that when the bracket member 71 is bolted to the panel 75 these lips, which are somewhat flexible, will form a fairly airtight seal. The same heat-insulating material as in wall 7 is preferably used throughout the form of the shroud 83. As a result the supporting and control parts for the strip 51 are enclosed within a confining compartment which also covers the air passage 89 in the panel 75. An air outlet nipple 91 is formed in connection with one of the side walls 85 for the reception of an air hose 87 which extends in appropriate manner to connect the by-pass air stream with the main air-circulating path of the cooling unit. It will be understood that the nipple 91 or the like might be on any wall of the shroud.

From the above it will be clear that, whenever the usual volume of air is circulated through the cooling unit, a by-passage of a small amount of room air will occur through the shroud 83 without delivery of any appreciable amount of heat from the operating contents of the housing 1. The use of the sensitive heat-insulated type of switch described responding accurately to small changes of by-pass room air temperatures, rather than to larger changes of the main flow of cooling air through the evaporator of the air conditioning unit, results in the switch responding more closely to small room temperature changes than would otherwise be possible.

In view of the above, it will be seen that the several objects of the invention are achieved and other advantageous results attained.

As various changes could be made in the above constructions without departing from the gist of the invention, it is intended that all matter contained in the above description or shown in the accompanying drawings shall be interpreted as illustrative.

What is claimed is:

1. A thermostatic switch for use in connection with a flow of a comparatively small amount of room air by-passing the main flow of room air being cooled by a room air conditioner, comprising:

switch contacts, a snap blade for operating said contacts, an enclosing housing containing the blade and contacts, a movable control link operatively engaged at one end with the blade within the housing, said link extending from the housing;

a thermostatic strip operatively engaged with the outer end of said link, a manual control member for said strip, bracket means supporting said strip and control member in position on and exteriorly of the housing;

a heat-confining enclosure for said strip including a heat-insulating portion interposed between said supporting means and said housing; said bracket means provided with means for fastening it to a wall of said air conditioner; said wall having an air inlet port; said enclosure being in the form of an open cup-shaped heat-insulating shroud, the margin of which is adapted sealingly to engage said wall around said air inlet port; and means to permit flow of by-pass air from said shroud to said main flow of air.

2. A thermostatic switch for use in an electrical components compartment of a room air conditioning unit having means for admitting a minor flow of air from the room through said compartment and by-passing the main flow of air through the unit, comprising:

switch contacts, a snap blade for operating said contacts, an enclosing housing containing the blade and contacts, a control link operatively engaged in the housing with the blade, said housing having a minimal opening for extension of the link therethrough;

an exterior thermostatic strip exteriorly operatively engaged with said link, an exterior control member for said strip, exterior bracket means supporting said strip and control member;

an enclosure for said exterior strip, including a heat-insulating portion interposed between said housing and said bracket means; means for holding together the housing, bracket means and interposed heat-insulating portion;

said bracket means provided with means for fastening it to an inside wall of said components compartment, said wall having an air inlet port;

said enclosure being in the form of an open cup-shaped heat-insulating shroud, the margin of which is adapted sealingly to engage said wall around said air inlet port;

and means for carrying by-pass air therefrom for direct return to said main flow of air.

3. A switch according to claim 2, wherein said by-pass air carrying means is in the form of a pipe extending from said shroud.

4. A switch according to claim 3, wherein said margin of the cup-shaped shroud is resilient.

5. A switch according to claim 4, wherein said shroud is in the general form of a rectangular box, the margins of which are outwardly flared.

References Cited

UNITED STATES PATENTS

| | | | |
|---|---|---|---|
| 3,395,375 | 7/1968 | Risk et al. | 337—347(X) |
| 3,239,633 | 3/1966 | Bletz | 337—347 |
| 2,823,283 | 2/1958 | Malone | 337—368 |
| 2,320,535 | 6/1943 | Peterson | 337—368 |

BERNARD A. GILHEANY, Primary Examiner

D. M. MORGAN, Assistant Examiner

U.S. Cl. X.R.

337—368, 380